United States Patent [19]
Nakamura

[11] Patent Number: 4,903,193
[45] Date of Patent: Feb. 20, 1990

[54] RUNAWAY DETECTING SYSTEM FOR CPU
[75] Inventor: Isao Nakamura, Iwate, Japan
[73] Assignee: Alps Electric Co., Ltd., Tokyo, Japan
[21] Appl. No.: 123,187
[22] Filed: Nov. 20, 1987
[30] Foreign Application Priority Data
  Mar. 11, 1987 [JP] Japan ............................ 62-56125
[51] Int. Cl.⁴ ............................................. G06F 11/00
[52] U.S. Cl. ................................. 364/200; 371/12;
  371/62; 364/260.4; 364/260.8
[58] Field of Search ............... 364/200, 300, 900;
  371/62, 12

[56] References Cited
U.S. PATENT DOCUMENTS

| | | | |
|---|---|---|---|
| 4,752,930 | 6/1988 | Kitamura et al. | 371/62 |
| 4,796,211 | 1/1989 | Yokouchi | 371/62 X |
| 4,803,682 | 2/1989 | Hara et al. | 364/200 X |

Primary Examiner—Raulfe B. Zache
Attorney, Agent, or Firm—Guy W. Shoup; Stephen L. Malaska; Gideon Gimlan

[57] ABSTRACT

A runaway detecting system for a CPU which has a resetter circuit started by the ON of a power source ON or the output of the CPU for outputting a reset signal to the system including the CPU, and first and second runaway detecting programs, the first runaway detecting program for incrementally or decrementally counting an error by a periodic timer interrupt and overflowing the timer when the error count coincides with a predetermined value, the second runaway detecting program for processing when a timer of the second runaway detecting program is restarted in a short period and outputting a drive signal of the resetter circuit. Thus, the runaway detecting system can detect the runaway of the CPU in a software to prevent in advance the motor or the circuit from damaging due to the runaway of the CPU.

8 Claims, 3 Drawing Sheets

RUNAWAY DETECTING SYSTEM FOR CPU

BACKGROUND OF THE INVENTION

1. Field of the Invention

This invention relates to a runaway detecting system for a CPU for detecting the runaway of the CPU to prevent in advance a motor or a circuit from damaging due to the runaway of the CPU in a software.

2. Description of the Prior Art

Generally, a specific program for detecting the runaway of a CPU has not yet presented. Thus, an operator has observed the runaway of the CPU after the process has become improper so that the motor or the circuit has already been damaged.

SUMMARY OF THE INVENTION

Accordingly, an object of this invention is to provide a runaway detecting system for a CPU which can overcome the above-mentioned drawbacks and which can detect the runaway of the CPU in a software to prevent in advance the motor or the circuit from damaging due to the runaway of the CPU.

In order to achieve the above object, there is provided according to the present invention a runaway detecting system for a CPU comprising a resetter circuit started by the ON of a power source ON or the output of the CPU for outputting a reset signal to the system including the CPU, and first and second runaway detecting programs, the first runaway detecting program for incrementally or decrementally counting an error by a periodic timer interrupt and overflowing the timer when the error count coincides with a predetermined value, the second runaway detecting program for processing when a timer of the second runaway detecting program is restarted in a short period and outputting a drive signal of the resetter circuit.

(Operation)

Since the runaway of the CPU is always managed by the runaway detecting system for the CPU with the construction as described above to detect the runaway of the CPU, the set counter is not cleared even when the interrupts of certain times are executed by the interrupt of the timer, and when it arrives at the set value, it is regarded as being that a malfunction (runaway) occurs in the processing state of the CPU to process an initialization. Or, when the output phases of the motor are fully outputted or the same phases are excited for a predetermined time or longer, the process is executed similarly to be regarded as being that the runaway of the CPU similarly occurs. Thus, it can prevent in advance the motor or the circuit from being damaging due to the runaway of the CPU in a software.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

An embodiment of a runaway detecting system for a CPU according to the present invention will be described in detail with reference to FIGS. 1 to 3.

Figure 1:
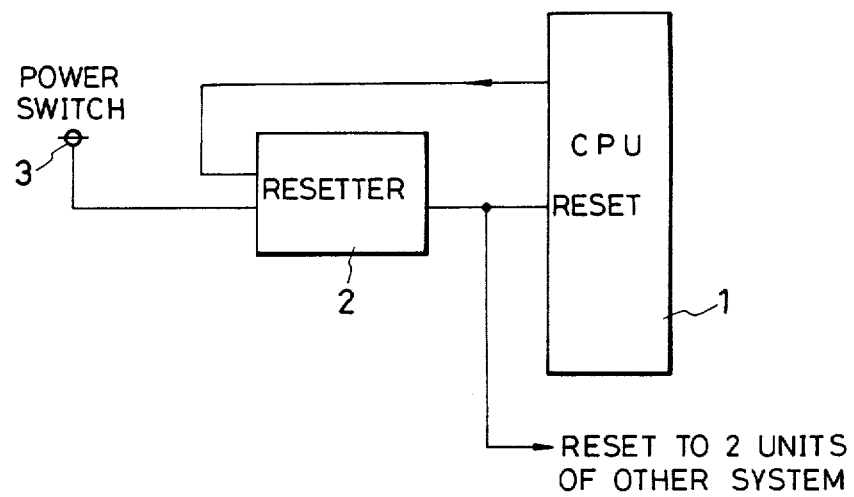
FIG. 1 is a block diagram of the construction of a hardware to execute a runaway detecting system for a CPU according to the present invention.

FIG. 1 is a block diagram of the hardware for executing the runaway detecting system for the CPU according to the invention. In FIG. 1, reference numeral 1 designates a CPU. Reference numeral 2 denotes a resetter circuit. The resetter 2 is connected to a power switch 3 and the CPU 1, and is started by the ON of the power switch 3 or the output of the CPU 1 to output a reset signal to the CPU 1 and other system units.

Figure 2:
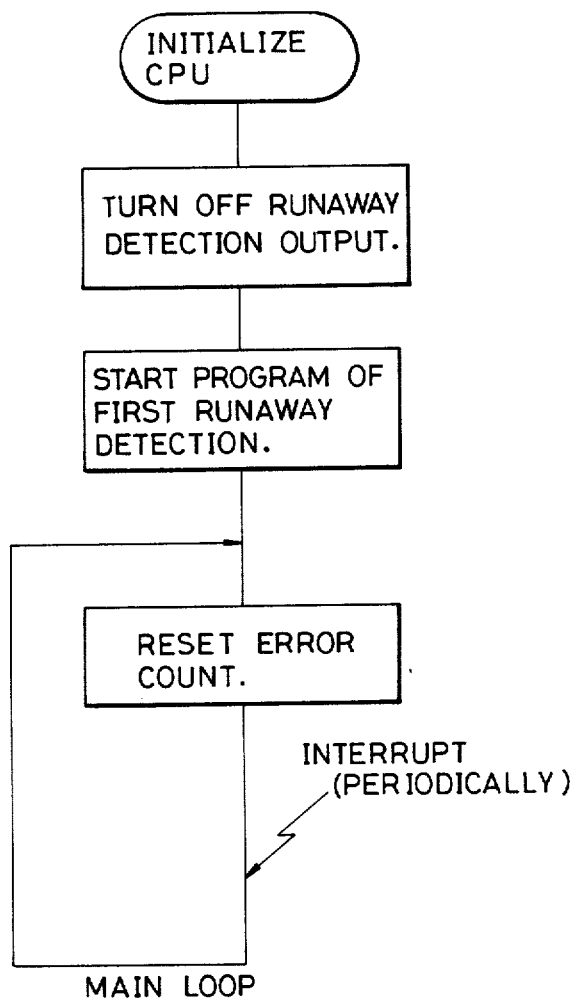
FIG. 2 is a flowchart for indicating the main process.

FIG. 2 is a flowchart for indicating the main process of the runaway detecting system for the CPU according to the invention. The runaway detecting system starts the first runaway detecting program after turning OFF the runaway detection output from the initialized state of the CPU 1. When the first runaway detecting program is started, it flows a loop while receiving a periodic interrupt signal of a timer during resetting of the error counting.

Figure 3:
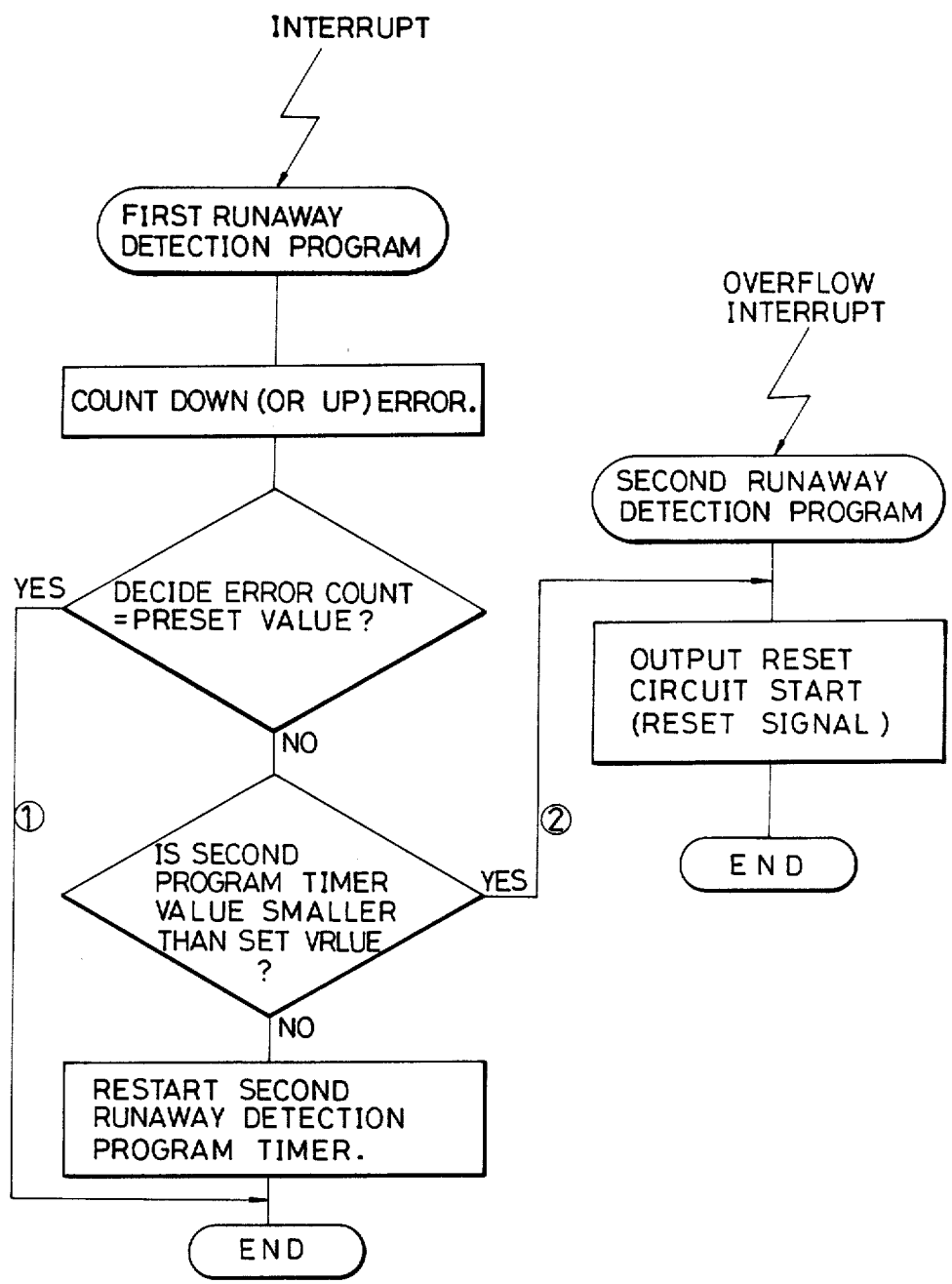
FIG. 3 is a flowchart for indicating the runaway detecting process.

Further, FIG. 3 shows a flowchart for indicating the process for detecting the runaway of the CPU. The first runaway detecting program which receives the periodic interrupt by the timer incrementally or decrementally counts the error by the interrupt. Then, decision whether the error count coincides with the preset predetermined value or not is made. If not coincident, the timer of the second runaway detecting program is restarted (reset) so that the second runaway detecting program is not processed by the overflowing interrupt of the timer, and is returned to a main loop. In this case, before returning to the main loop, decision for comparing the value of the timer of the second runaway detecting program with a predetermined value is made, and the process is returned only when the value of the timer is smaller than the predetermined value. The decision for comparing the value of the second timer with the predetermined value concretely checks whether the timer of the second runaway detecting program is restarted or not in a short period (predetermined time). When arriving at the predetermined value, a malfunction occurs in the program so that a reason, such as no passage of a normal loop, exists. Accordingly, the second runaway detecting program is processed irrespective of the error count by the first runaway detecting program, i.e., the resetter 2 is driven to output a reset signal and to initialize the CPU 1.

When the error count coincides with the predetermined value by the first runaway detecting program, the timer of the second runaway detecting program is not started (reset), but the overflow of the timer occurs to drive the resetter 2. In other words, in FIG. 3, the flowing lines (1) or (2) is conducted only when the CPU 1 is regarded as being run away.

The runaway detecting system for the CPU according to the invention as described above automatically processes (carries out) the second runaway detecting program by the overflow of the timer when the first runaway detecting program is stopped by the runaway, and when the second runaway detecting program is stopped by the runaway, it is automatically restarted by the first runaway detecting program. Even when the second runaway detecting program does not pass the normal loop or the interrupt of the timer is executed within a predetermined time due to a cause, such as a malfunction in addressing, the resetter 2 is driven to process the resetting.

According to the runaway detecting system for the CPU in accordance with the present invention as described above, the process, such as an initialization is immediately executed when the CPU is regarded as being run away to prevent in advance the motor or the circuit from being damaging due to the runaway of the CPU in a software.

What is claimed is:

1. A runaway detecting system for detecting the runaway of a CPU in a CPU system comprising:
   resetter circuit means, activated by the turning ON of a power source of the CPU system or by a reset output signal of the CPU, for outputting a system reset signal to the CPU system to thereby reset the CPU, and
   first and second runaway detecting programs, operatively coupled to the CPU for controlling the CPU when they are activated by respective signals from corresponding first and second timers,
   the first runaway detecting program including error counting means for incrementally or decrementally changing an error count upon receipt of a periodic timer interrupt generated by the first timer and overflow-causing means for causing the second timer to overflow when the error count coincides with a predetermined value,
   the second runaway detecting program including reset signal generating means for generating said reset output signal to thereby reset the CPU either when said second runaway program timer overflows or when said second timer of the second runaway detecting program is restarted more than once before a predetermined period has elapsed.

2. The system of claim 1 wherein said first runaway detecting program includes comparison means for comparing a timer value of the second timer against the length of the predetermined period and activating the reset signal generating means when the timer value is less than the length of the predetermined period.

3. A system for detecting the runaway of a CPU in a CPU system, comprising:
   resetting means for resetting the CPU either when power is initially applied to the CPU system or when a self-restarting output signal is generated by the CPU; and
   program means operatively coupled to the CPU to control said CPU, said program means including main loop means for cycling the CPU through a main loop of CPU operations, the main loop being capable of periodic interruption by an error count incrementing routine which increments an error count and the main loop means having an error count resetting means for resetting the error count with each successful cycling of the CPU through the main loop,
   said program means further having reset causing means for causing said self-restarting output signal to be outputted from said CPU when the main loop means fails to reset the error count within a predetermined loop time.

4. A runaway detecting system as in claim 3, further comprising:
   first program timer means for periodically interrupting the main loop and causing said error count incrementing routine to be executed, and
   second program timer means, having a timer value that increases with time toward an overflow value, for causing said output signal to be outputted from said CPU when said second program timer overflows,
   and wherein the program means includes timer reset means for periodically resetting the second program timer means.

5. A runaway detecting system as in claim 4, wherein said program means includes:
   timer value evaluation mans for evaluating said second timer value and causing said second timer value to reset when said second timer value is found to be within a predetermined range at the time of evaluation and for causing said output signal to be outputted from said CPU when said second timer value is found to be outside the predetermined range.

6. A runaway detecting system as in claim 3, wherein said program means includes:
   error counting means for periodically incrementing the error count; and
   error count evaluation means for evaluating said error count and causing said output signal to be outputted from said CPU when said error count coincides with a preset value.

7. A runaway detecting system as in claim 3, wherein said program means includes:
   timer value evaluation means that evaluates said second timer value and generates a first signal when said second timer value is evaluated to be within a predetermined range and generates a second signal when said time value is evaluated to be outside said predetermined range, said evaluation occurring after a periodic interrupt signal is received.

8. A system for detecting and halting a runaway condition in a CPU comprising:
   main loop means for causing the CPU to cycle through a main loop of operations, being an error count reset operation which resets an error count; and
   first and second interrupt servicing means, operatively coupled to the CPU, for servicing interrupts generated by respective first and second timers, where the first timer generates interrupts periodically during the running of the main loop and where the second timer generates an overflow interrupt if a timer value thereof is allowed to increase with time from a reset value to an overflow value,
   wherein the second interrupt servicing means comprises reset means for generating a reset signal which causes the CPU to reset, and
   wherein the first interrupt servicing means comprises:
   second reset means for resetting the second timer,
   error count incrementing means for incrementing the error count away from its reset value,
   error count comparison means for determining whether the error count coincides with a preset value and for inhibiting the operation of the second reset means when such a coincidence occurs, and
   timer value comparison means for determining whether the value of the second timer is smaller than a predetermined set value and for activating the second interrupt servicing means if the second timer value is found at the time of determination to be smaller than the set value.

* * * * *

UNITED STATES PATENT AND TRADEMARK OFFICE
CERTIFICATE OF CORRECTION

PATENT NO. : 4,903,193
DATED : February 20, 1990
INVENTOR(S) : Isao Nakamura

It is certified that error appears in the above-identified patent and that said Letters Patent is hereby corrected as shown below:

Col. 4 Line 14 - Claim 5

"mans" should read --means--

Signed and Sealed this

Twenty-eighth Day of May, 1991

Attest:

HARRY F. MANBECK, JR.

Attesting Officer

Commissioner of Patents and Trademarks